United States Patent [19]

Watanabe et al.

[11] Patent Number: 4,920,535
[45] Date of Patent: Apr. 24, 1990

[54] DEMULTIPLEXER SYSTEM

[75] Inventors: Toshiaki Watanabe, Kawasaki; Kazuo Iguchi, Yokohama; Tetsuo Soejima, Tokyo; Shinji Ohta, Kawasaki, all of Japan

[73] Assignee: Fujitsu Limited, Kawasaki, Japan

[21] Appl. No.: 284,395

[22] Filed: Dec. 14, 1988

[30] Foreign Application Priority Data

Dec. 14, 1987 [JP] Japan .................. 62-315821

[51] Int. Cl.⁵ .............................. H04J 3/06
[52] U.S. Cl. ........................ 370/105.1; 370/105.4
[58] Field of Search ............ 370/100, 105, 106, 100.1, 370/105.1, 105.2, 105.4; 375/114, 116

[56] References Cited

U.S. PATENT DOCUMENTS 4,688,218 8/1987 Blinean et al. ............... 370/106
4,744,081 5/1988 Buckland ..................... 370/100

Primary Examiner—Douglas W. Olms
Assistant Examiner—Melvin Marcelo
Attorney, Agent, or Firm—Staas & Halsey

[57] ABSTRACT

A demultiplexing circuit includes a frame synchronization circuit which simultaneously detects the occurrence of a predetermined frame synchronization pattern and the occurrence of a predetermined identification byte within the frame synchronization pattern. Since the pattern and identification bit are detected simultaneously and from the same data, the circuit is simplified and the demultiplexing is performed more quickly and efficiently.

9 Claims, 3 Drawing Sheets

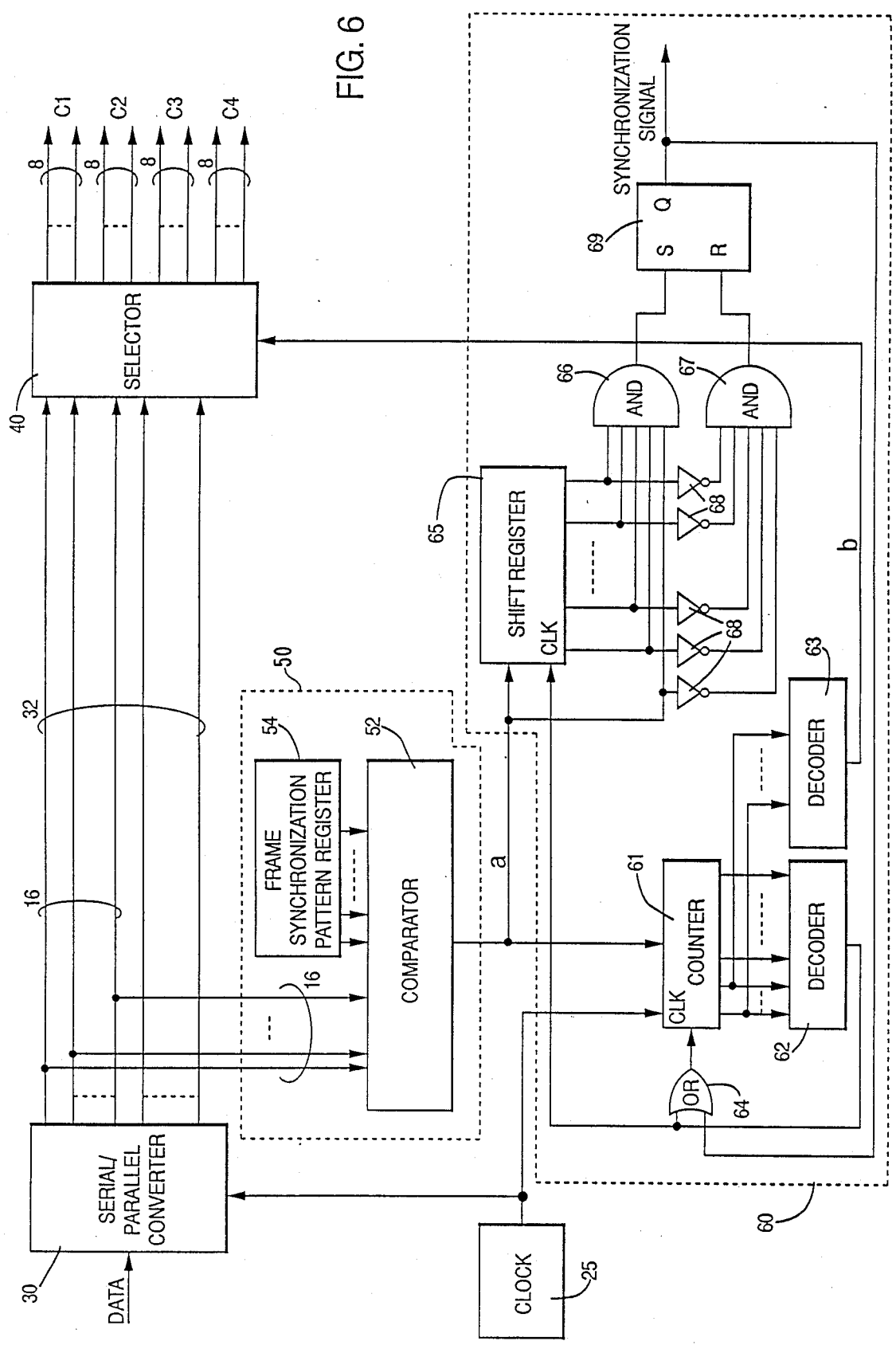

DEMULTIPLEXER SYSTEM

BACKGROUND OF THE INVENTION

1. Field of the Invention

The present invention relates to a demultiplexer system used in digital communication and particularly to frame synchronizing suitable for use in a byte multiplexing system.

Digital communication systems employ byte multiplexing transmission to increase the transmission rate on a transmission path, and thus to improve communication efficiency.

FIG. 1 illustrates the multiplexing/demultiplexing of a plurality of channels in a known byte multiplex transmission system. In FIG. 1, a plurality of 8 bit frame bytes F1 are input via channels C1–C4 to a multiplexer 10 at a basic speed. The frame bytes are multiplexed by multiplexer 10 and transmitted as byte multiplexed data 5 at, for example, four times the basic speed. The frame bytes F1 corresponding to channels C1–C4 (called a frame) are received by a demultiplexer 20.

In a byte multiplexing transmission system such as shown in FIG. 1, it is desirable to simplify the detection and synchronization of a frame pattern of a frame to ensure effective and efficient demultiplexing.

2. Description of the Related Art

FIG. 2 illustrates data in a transmission format as transmitted over a transmission line. In the FIG. 2 format a frame comprises four data bytes. FIG. 2 illustrates two frames, the first comprising bytes F1 and the second comprising bytes F2. Reference characters C1–C4 indicate channels C1–C4; ID denotes identification bytes for identifying the channel numbers and D denotes data bytes, each data byte comprising 8 bits. For transmission systems utilizing this data transmission format at least two methods of frame pattern detection and demultiplexing are known.

Referring to FIG. 3A, frame pattern detection is carried out periodically. A frame pattern comprising frames F1 and F2 is detected. The detection is executed once every fourth byte at the time indicated by the arrows, which correspond to channel C1. The detection of every fourth byte establishes a reference byte which is used to establish frame synchronization. Thereafter, the channel number is identified by the identification byte ID and the bytes are matched up with their respective channels and returned to the same sequence as they existed prior to multiplexing.

In the frame pattern illustrated in FIG. 3A, only the bytes of channel C1 need be detected to establish frame synchronization. Therefore, the circuit required for frame pattern detection using the frame pattern of FIG. 3A does not need to be very complex. However, the channel number sequence for the multiplexer must be identified with the identification byte ID so that the demultiplexer can output the data in the proper sequence. This requires additional hardware which complicates the circuit. The demultiplexing process is delayed because the bytes cannot be redistributed to the proper channels until the ID byte is detected and used to correlate a frame byte with its proper channel.

Referring to FIG. 3B, all frame bytes are detected simultaneously. Frame synchronization and identification of channel numbers are accomplished simultaneously by detecting, at one time, all bytes of frames F1 and F2 of channels C1–C4 from the transmission format illustrated in FIG. 2.

In the frame pattern illustrated in FIG. 3B, all of the multiplexed frame patterns must be detected. Accordingly, the identification byte ID is not needed. However, because all of the bytes must be checked during the pattern detection process (for example detection must be done for total of 64 bits (8 bits×8 bytes)), the circuit for the detection circuit is very complicated and the speed is diminished because of the time required to detect all of the bits.

SUMMARY OF THE INVENTION

It is an object of the present invention to provide a demultiplexer system which does not require separate identification bytes in addition to a frame synchronization pattern, in order to identify the multiplexing sequence of each channel of a multiplexed signal.

It is another object of the present invention to provide a demultiplexer system capable of being embodied in a small, simplified pattern detecting circuit.

According to the present invention, there is provided a demultiplexer for demultiplexing frames including frame bytes, said demultiplexer comprising converting means for converting serial multiplexed data into parallel multiplexed data; pattern detecting means for detecting a predetermined frame pattern, the predetermined frame pattern comprising a last frame byte of a first frame of data bytes and a first frame byte of a successive frame of frame bytes; frame synchronization means for generating a selection signal indicating the detection of the last frame byte of the first frame simultaneously with the detection of the predetermined frame pattern; and selector means for arranging the frame bytes based on the selection signal.

These together with other objects and advantages which will be subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a more detailed block diagram of the FIG. 5 embodiment.

DESCRIPTION OF THE PREFERRED EMBODIMENTS

According to the present invention, an input signal comprising byte multiplexed frame bytes is converted into parallel frame bytes and is subjected to pattern detection.

Figure 4:
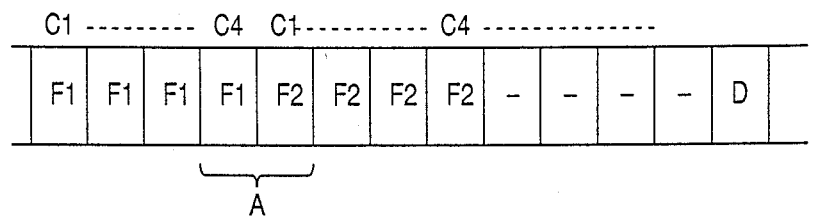
FIG. 4 illustrates two frames of frame bytes utilized by the present invention.

FIG. 4 illustrates two frames of frame bytes utilized by the present invention. With the FIG. 4 data pattern, frame pattern detection can be performed every first and fourth frame byte, i.e., for the last channel (C4) of a frame comprising the channels C1–C4 corresponding to the frame bytes F1 and the first channel (C1) of the next successive block comprising the channels C1–C4 corresponding to the frame bytes F2.

Referring to FIG. 4 the present invention detects the two frame bytes labeled A. These two frame bytes represent a predetermined frame pattern. In the demultiplexer system of the present invention, detection of the predetermined frame pattern is done simultaneously with generation of a selection signal (SEL). The selection signal SEL indicates detection of the frame byte corresponding to the last channel C4 of the preceding frame.

Figure 1:
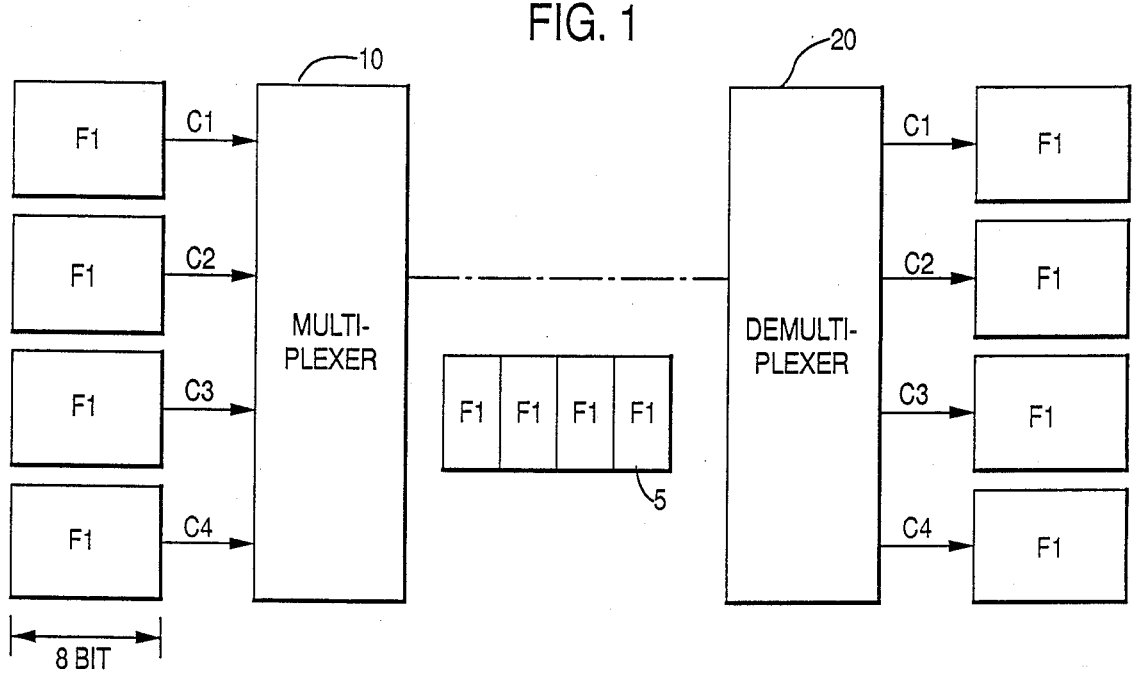
FIG. 1 is a block diagram of a byte multiplex transmission system.
Figure 2:
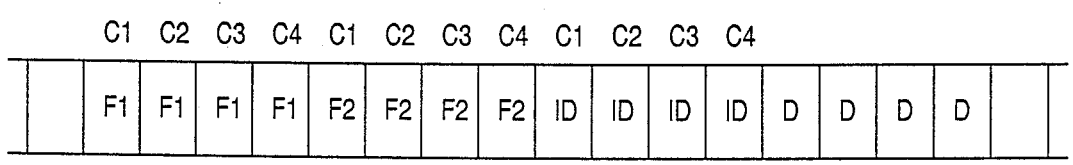
FIG. 2 illustrates data in a transmission format as transmitted over a transmission line.
Figure 3A:
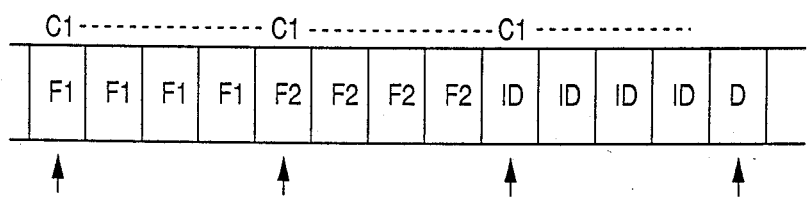
FIGS. 3A and 3B illustrate frame patterns employed by demultiplexing circuits of the prior art.
Figure 3B:
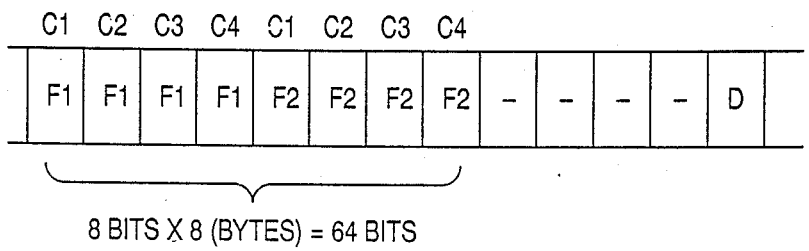

Since pattern detection is carried out for the predetermined frame pattern only, a pattern detector circuit does not need to be complex. This is because the predetermined frame pattern is only two frame bytes. The predetermined frame pattern is not limited to the two byte pattern discussed herein. The identification byte ID shown in FIG. 3A is not needed with the present invention, because the position of the individual channels (e.g., the position of channel C4 in FIG. 4) for (i.e., from bytes) is detected simultaneously with detection of the predetermined frame pattern.

Figure 5:
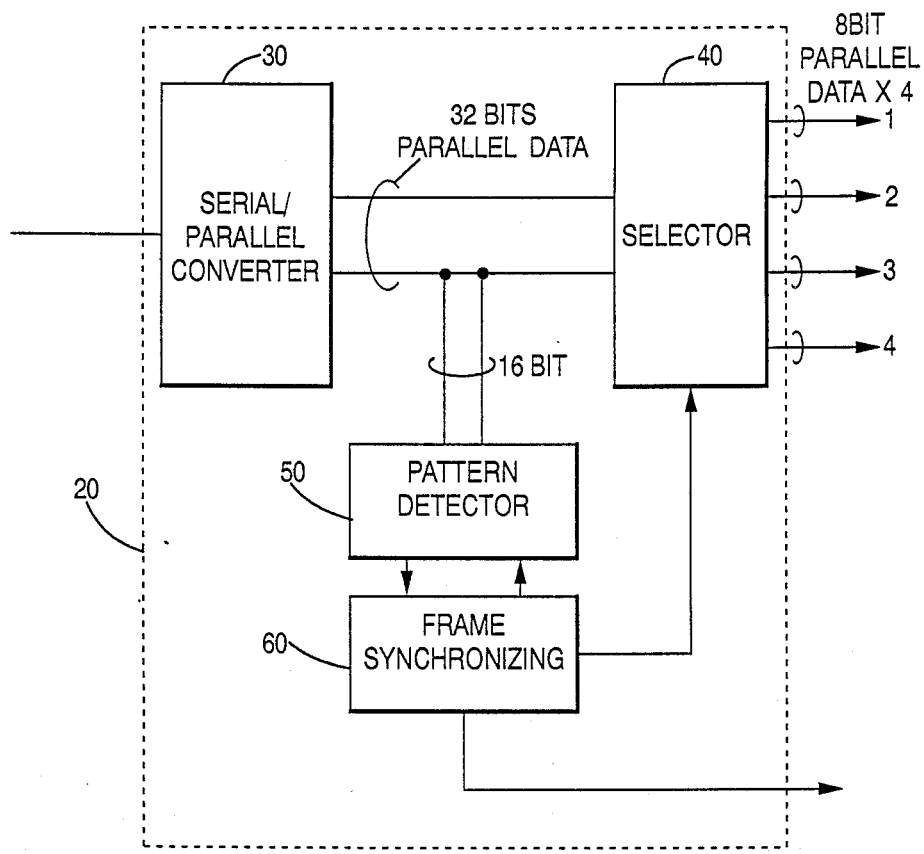
FIG. 5 is a block diagram of a preferred embodiment of the present invention.

FIGS. 5 and 6 are a general block diagram and a more detailed block diagram, respectively, of an embodiment of the present invention illustrating a frame pattern detection and frame synchronizing circuit which utilizes the data pattern illustrated in FIG. 4. In FIGS. 5 and 6, serial/parallel (S/P) converter 30 can comprise, for example, a shift register. The serial/parallel converter 30 converts the byte multiplexed frame bytes (serial data) to 32 bit parallel frame bytes. In the embodiment shown in FIG. 5, the serial/parallel converter 30 functions as a converting means. Pattern detector 50 can comprise, for example, a comparator 52 and a frame synchronization pattern register 54 (FIG. 6). In the embodiment shown in FIG. 6, the comparator 52 and frame synchronization pattern register 54 function as a pattern detecting means. Referring to FIG. 6, comparator 52 compares 16 bit (two byte) groups output from serial/parallel converter 30 with data representing the predetermined frame pattern stored in frame synchronization pattern register 54. When pattern detector 50 detects the two bytes of F1 and F2 forming the predetermined frame pattern (indicated by A in FIG. 4) from the parallel data output from serial/parallel converter 30, it outputs a DETECTION signal (e.g., a logic 37 1").

Frame synchronizing circuit 60 includes a counter 61 which begins counting upon receipt of the DETECTION signal, and continues counting until it reaches a count equal to the number of bytes in one frame (in the FIG. 4 data pattern, the count equals 4). This number of counts is called one frame counting sequence (FCS). The counter 61 then stops counting until another DETECTION signal is received. When the pattern is detected again, the counter 61 begins counting again, stopping after counting one FCS.

After each FCS, decoder 62 outputs an FCS signal, which is input to a shift register 65. The FCS signal indicates that an FCS has been completed. With each FCS signal, one of the outputs of shift register 65 switches from a first logic state to a second logic state (e.g., from logic "0" to logic "1"). After a predetermined FCS threshold number is reached (for example, 7) all of the outputs of shift register 65 are logic 1, causing an AND gate 66 to output a logic "1" to a flip-flop 69. This sets flip-flop 69, causing it to output a SYNC signal. Counter 61 receives the SYNC signal via OR gate 64, causing counter 61 to continue to count, even when DETECTION signals are not received. This is known as backward protection or backward error analysis.

Once synchronized, the demultiplexer 20 continues to monitor the input multiplexed data using forward protection or forward error analysis, described hereinafter. If the frame pattern is not detected for a predetermined threshold number of times (called a "No Detection" or ND threshold number), the outputs of the shift register 65 all switch to the first logic state, for example, a logic "0". These outputs are inverted via inverters 68 and input to AND gate 67. AND gate 67 outputs, for example, a logic "1", resetting flip-flop 69, and causing the counter 61 to revert back to counting only upon receipt of a DETECTION signal. This continues until the FCS threshold number is once again met. Thus, the forward and backward error analysis assures that the pattern detection is accurate before synchronizing, and also causes the demultiplexer 20 to attempt to resynchronize upon loss of synchronization.

As noted above, a selection signal SEL is generated simultaneously with the detection of the predetermined frame pattern. The selection signal SEL indicates the detection of the frame byte corresponding to the last channel C4 of the preceding frame. A decoder 63 detects the clock timing indication, from clock 25, of the last byte of an FCS (in this example, the fourth byte). This byte corresponds to the channel C4. Decoder 63 outputs a SEL signal to selector 40, which can comprise, for example, a latch circuit. The selector 40 functions as a selector means. Decoder 63, via the SEL signal, causes selector 40 to associate the multiplexed data with the proper channel and output it accordingly.

In the FIG. 6 embodiment, shift register 65, AND gates 66 and 67, inverters 68 and flip-flop 69 function as a means for outputting a signal indicating that a predetermined number of FCS signals have been output by decoder 6 and for outputting the SYNC signal. This output means combined with counter 61, OR gates 64, and decoders 62 and 63 function as a frame synchronization means. When the predetermined number of stages of protection are acquired (i.e., when the FCS threshold is met), the SYNC signal is sent to a synchronization terminal (not shown) indicating that synchronization exists. Moreover, the SEL signal indicating the last channel, for example, C4 is generated. Selector 40 outputs the data of channels C1–C4 to their designated output lines as 8 bit parallel signals by selecting such data in accordance with the SEL signal from the signal developed in parallel in the serial/parallel converter 30.

As explained above, the predetermined frame pattern comprising the last frame byte of one frame and the first frame byte of a succeeding frame is detected as in the example of FIG. 4. This simplifies the circuit for pattern detection. Moreover, since the position of channel C4 can be recognized by this predetermined frame pattern detection, it is not necessary to use a separate identification byte ID to identify the channel numbers as in the prior art shown in FIG. 3A.

The system of the present invention is not limited only to the case where the frame pattern is composed of two bytes and may be formed by three or more bytes. In this case, the frame synchronizing may be set by respective pattern detection at the two or more boundaries.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A demultiplexer system for demultiplexing frames including frame bytes, comprising:
   converting means for receiving and converting serial multiplexed frame bytes into parallel multiplexed frame bytes;
   pattern detecting means for detecting a predetermined frame pattern, said predetermined frame pattern comprising a last frame byte of a first frame and a first frame byte of a successive frame;
   frame synchronization means for generating a selection signal indicating the detection of said last frame byte of said first frame simultaneously with the detection of said predetermined frame pattern; and
   selector means for arranging the frames based on said selection signal.

2. A demultiplexer system as recited in claim 1, wherein said pattern detecting means comprises:
   frame synchronization pattern means for storing data representing said predetermined frame pattern; and
   comparing means, coupled to said converting means and to said frame synchronization pattern means, for comparing said data representing said predetermined frame pattern with received frame bytes so as to detect said predetermined frame pattern and for outputting a detection signal responsive to said comparison.

3. A demultiplexer system as recited in claim 2, wherein said comparing means includes means for providing said detection signal when said received frame bytes coincide with data representing said predetermined frame pattern.

4. A demultiplexer system as recited in claim 3, wherein said frame synchronization means comprises:
   counting means for counting frame bytes in response to said detection signal; and
   first decoding means for outputting a first signal each time said counting means counts a number of frame bytes equal to a frame.

5. A demultiplexer system as recited in claim 4, wherein said counting means includes:
   means for counting frame bytes in response to a synchronization signal, and wherein said frame synchronization means further comprises:
   means for outputting a signal indicating that a predetermined number of the first signals have been output by said first decoding means and for generating said synchronization signal; and second decoding means for detecting a predetermined byte of said frame pattern and outputting said selection signal.

6. A demultiplexer system as recited in claim 1, wherein said converting means comprises a shift register.

7. A demultiplexer system as recited in claim 1, wherein said selector means comprises a latch circuit.

8. A demultiplexer system for demultiplexing frames including frame bytes, comprising:
   converting means for receiving and converting serial multiplexed frame bytes into parallel multiplexed frame bytes;
   frame synchronization means for simultaneously detecting a predetermined frame synchronization pattern and a predetermined byte within said frame synchronization pattern; and
   selector means for arranging the frames based on said predetermined byte.

9. A demultiplexer system for demultiplexing frames including data bytes, comprising:
   first shift register means for receiving and converting serial multiplexed frame bytes into parallel multiplexed frame bytes;
   frame synchronization pattern register means for storing data representing a predetermined frame pattern;
   comparing means, coupled to said shift register means and to said frame synchronization pattern register means, for comparing said data representing said predetermined frame pattern with received frame bytes so as to detect said predetermined frame pattern and for outputting a detection signal when said data representing said predetermined frame pattern coincides with received frame bytes;
   counter means, coupled to said comparing means, for counting frame bytes in response to said detection signal and for counting frame bytes in response to a synchronization signal;
   first decoder means, coupled to said counter means, for outputting a first signal each time said counter means counts a number of frame bytes equal to one frame;
   second decoder means, coupled to said counter means for detecting a predetermined frame byte of said frame pattern and for outputting a selection signal;
   second shift register means, coupled to said first decoder means and to said comparing means, for outputting a second signal indicating that a predetermined number of said first signals have been output by said first decoder means;
   flip-flop circuit means, coupled to said second shift register means and to said counter means, for outputting said synchronization signal based on the second signal; and
   latch circuit means, coupled to said second decoder means, for arranging the data bytes based on said selection signal.

* * * * *